Patented May 11, 1948

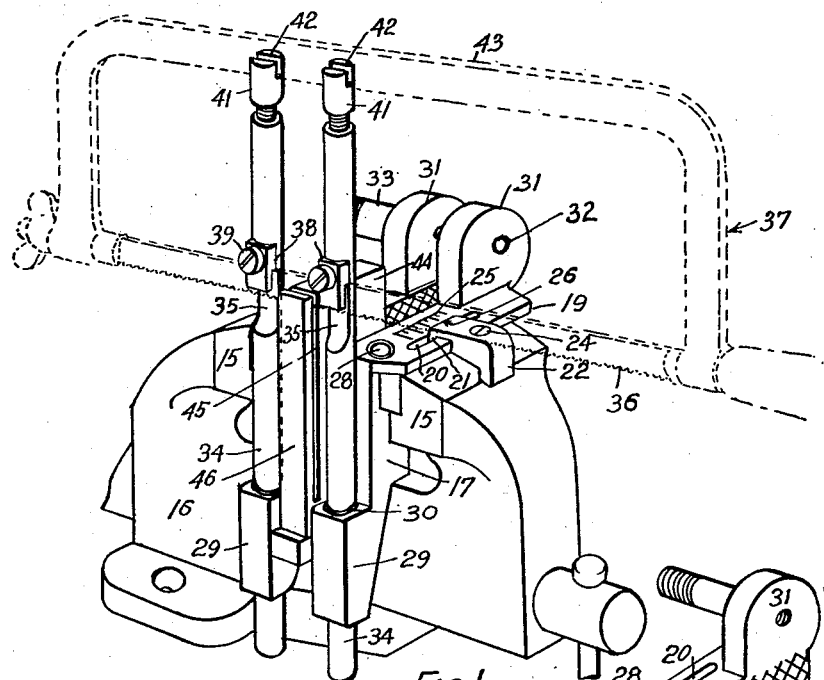
FIG.1.
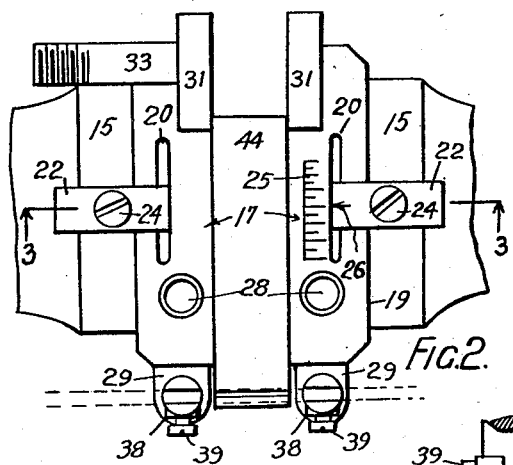
FIG.2.
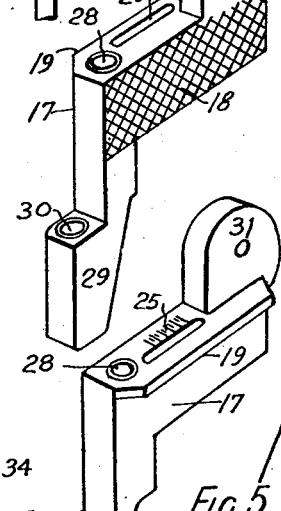
FIG.5.
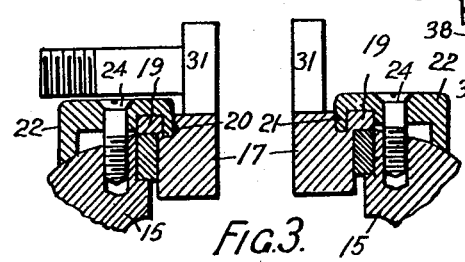
FIG.3. FIG.4.
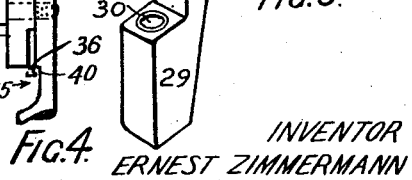
INVENTOR
ERNEST ZIMMERMANN
BY Featherstonhaugh & Co.
ATTORNEYS May 11, 1948.  E. ZIMMERMANN  2,441,379
HAND SAWING APPARATUS
Filed March 19, 1945  3 Sheets-Sheet 2
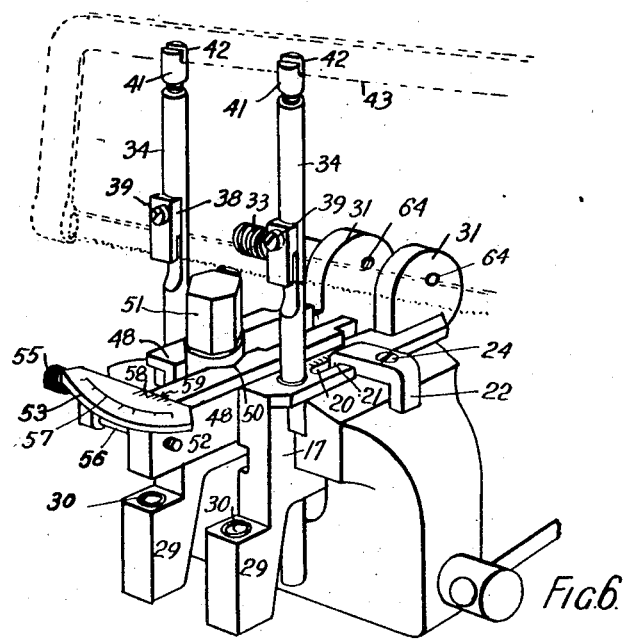
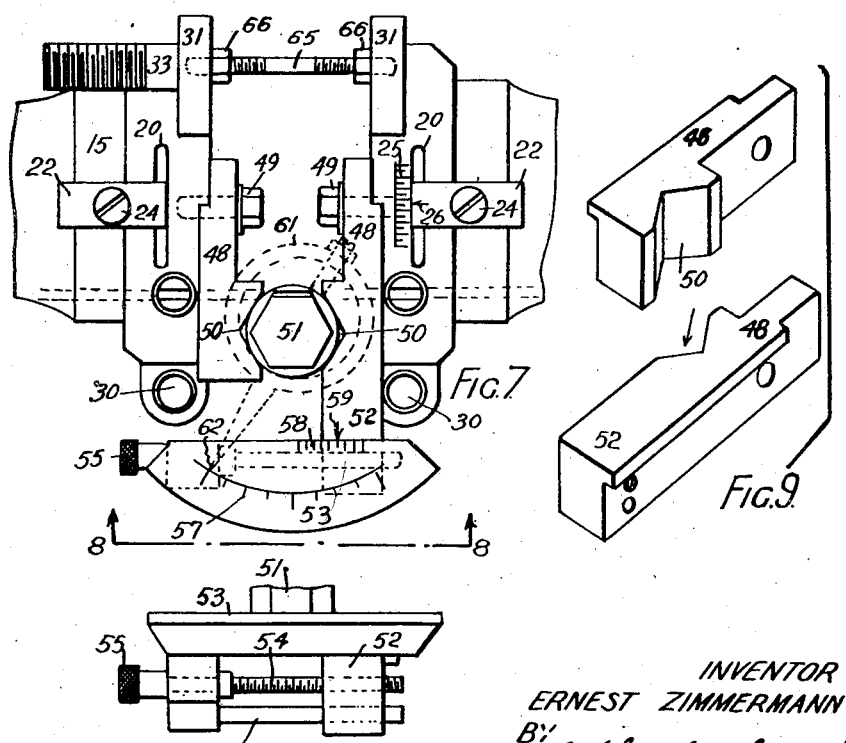
INVENTOR
ERNEST ZIMMERMANN
BY Fetherstonhaugh & Co.
ATTORNEYS

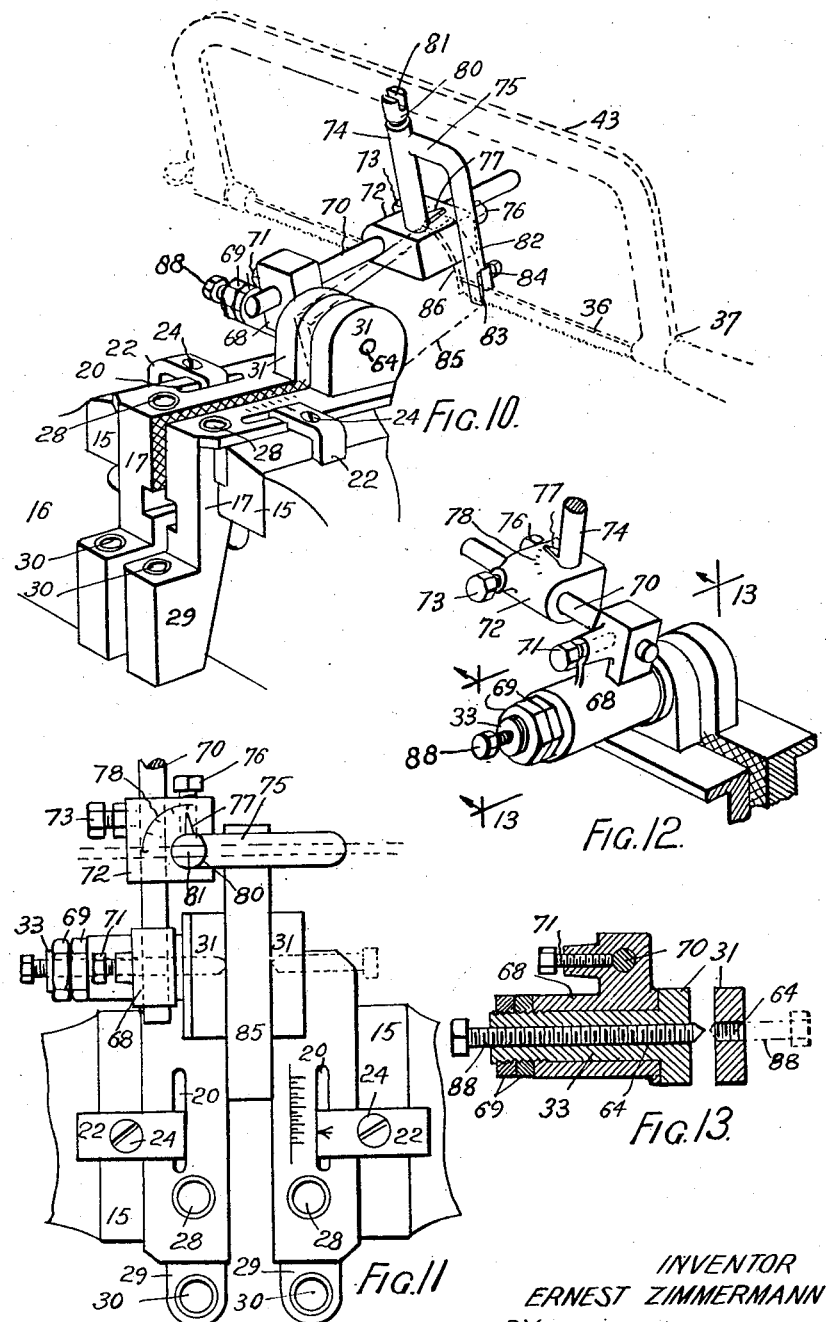

2,441,379

UNITED STATES PATENT OFFICE 2,441,379

HAND SAWING APPARATUS

Ernest Zimmermann, Surry Hills, near Sydney, New South Wales, Australia

Application March 19, 1945, Serial No. 583,488
In Australia February 11, 1944

8 Claims. (Cl. 29—75)

This invention relates to apparatus for use in the hand sawing of metals and the like as in the engineering trade.

Hand sawing of metal plate and other material is an operation requiring great care and skill particularly in keeping to a marked-out line, and even with the exercise of such skill and care considerable filing is often required afterwards to true-up the surface of the saw cut or cuts.

The present invention has been specially devised to provide means for a comparatively simple nature whereby hand sawing can be more accurately performed even by an inexpert worker thereby obviating a great detal of the truing-up and correction of the edge or other surface rendered necessary hitherto, thus saving an expenditure of both time and labour.

The invention is suited for straight and angular sawing, also parallel lines of sawing, slotting and the like as well as for effecting square, hexagonal and other shapings from rod material and the like, also for cutting curved and circular patterns, ratchet teeth, and other formations. The thickness of hacksaw blades may also be reduced as by such reduction the cutting effort is less laborious and the work more quickly done.

According to this invention the hand sawing apparatus consists broadly of one or more jaw members adapted to be clamped in a vise or other suitable place (or forming part of such vise) and having provision for affixing the work to be sawn therein. The jaw member or members has or have in association therewith means whereby a hacksaw blade is guided in its passage through the work and as well, means whereby the frame of the hacksaw is supported and also guided in such a manner as to facilitate the passage of the saw blade through the work. Provision is had for adjustment as to height and angularity and otherwise positioning of the guide and other means employed with the saw member or members, and in some cases templates or guides may also be provided for directing the saw blade to cut certain patterns or shapings. There may be provision also for dividing or spacing saw cuts.

In order to describe the invention more fully reference will now be made to the drawings accompanying and forming part of this complete specification, and wherein:

Figure 1 is a perspective view of a practical embodiment of hand sawing apparatus according to the invention illustrating how a work piece can be cut into bars or strips.

Figure 2 is a plan view thereof.

Figure 3 is a vertical section on line 3—3 of Figure 2.

Figure 4 is a detailed view of the saw blade guide.

Figure 5 is a perspective view of the jaw members.

Figure 6 is a perspective view of the sawing apparatus depicting how a hexagonal prism is cut.

Figure 7 is a plan view thereof.

Figure 8 is an elevation view on line 8—8 of Figure 7.

Figure 9 is a perspective view of the jaw members.

Figure 10 is a perspective view of the sawing apparatus as utilized for cutting curves.

Figure 11 is a plan view thereof.

Figure 12 is a perspective view of a part of the sawing apparatus.

Figure 13 is a vertical section on line 13—13 of Figure 12.

Referring to Figures 1 to 5 inclusive, the sawing aparatus is mounted between the jaws 15 of an ordinary bench vise 16 and comprises a pair of oppositely disposed jaw members hereinafter referred to as subsidiary jaws 17 with serrated faces 18. Each subsidiary jaw 17 has a flange 19 adapted to rest upon the top face of the vise jaws 15, and is furnished with an elongated slot 20 into which is adapted to fit the turned down tongue piece 21 of a clamping member 22, which is secured to a jaw 15 by means of a screw 24 (see Figure 3). One of these subsidiary jaws 17 has scale markings or graduations 25 and one of the clamping members 22 is provided with an indicator mark 26 adapted to register with the scale markings 25 as shown in Figures 1 and 2.

Each subsidiary jaw 17 has at one end a vertically disposed through orifice 28, also a stepped lug 29 provided with a vertically disposed through orifice 30, and has at the other end an ear piece 31 and these are oppositely disposed to one another, and furnished with a through opening 32 one or both of which may be threaded. One of the said ear pieces 31 has a horizontally disposed boss 33 for the purposes hereinafter described, and portion of said boss is screwed.

Adapted to slidably fit within any of the vertical through orifices 28 and 30 are guide rods 34 each of which has a recessed portion 35 (see Figures 1 and 4) adapted to receive the saw blade 36 of a hack saw 37. The saw blade 36 is maintained in sliding position by a guide block 38 affixed to the guide rod 34 by a clamping screw 39 and each recess 35 has a clearance 40 to accommodate the off-set of the saw blade teeth. Located at the top of each guide rod 34 is an adjustable block 41 provided with a kerf 42 into which the back-bone 43 of the hack saw 37 is adapted to slide, and the said blocks 41 are adjusted so that the saw blade 36 and the said backbone 43 can be reciprocated freely.

In operation, a work piece 44 is inserted between the subsidiary jaws 17 and firmly clamped therein. The hack saw 37 being set in position with its blade 36 under the guide block 38 and the back-bone 43 fitted in the kerfs 42, it is reciprocated and cuts the work piece as at 45, and as the said saw descends simultaneously the guide rods 34 descend, accurately guiding the blade 36 and a strip 46 is cut. The blocks 41 are screwed up or down to adjust them to the required height.

By slacking the grip of the jaws 15 the work piece 44 can be moved into the next cutting position between the subsidiary jaws 17.

The guide rods 34 are shown in the drawings inserted in the pair of through orifices 30, but for certain work they may be more conveniently fitted in the upper pair of through orifices 28.

Referring to Figures 6 to 9 inclusive which cover a modification showing how the apparatus is used to cut a hexagonal prism the apparatus is substantially the same as described with reference to the foregoing Figures 1 to 5 and similar parts bear similar reference numerals.

To each of the subsidiary jaws 17 an additional jaw or block 48 is affixed thereto by means of a screw bolt 49 and has a V-shaped recess 50 and said recesses are oppositely disposed to one another and are adapted to receive and hold the work piece 51 which in this case is a rod which is cut into a hexagon prism or bar. One of the jaws 48 has an extension 52 adapted to support a slidable table 53 furnished with a feed screw 54, screw threaded into the said extension 52 and provided with a knuried knob 55 and a guide rod 56 being a beam in the extension 52.

Upon the top of the table 53 is a degree scale 57, and also lateral scale markings 58 with which the indicating mark 59 on the extension registers. When cutting a prism in order to obtain the correct angular positions, the work piece 51 is provided with a removably affixed indicator 61 of collar-like form having a pointer 62 adapted to register with the degree markings 58 (see Figure 7).

The ear pieces 31 have each an orifice 64 one or both of which may be screwed, adapted to receive a rod 65 having screw threaded ends and clamping nuts 66 thereon acting as a distance piece whereby an even grip is given by the jaws 48 onto the work piece 51 and to maintain alignment thereof.

The guide rods 34 are inserted into the orifices 28 and the operation of cutting is as before described. On completion of a cutting operation the jaws 48 are slackened back sufficiently whereby the work piece 51 can be partially rotated and set by the pointer 62 and the degree scale 57 into its next position ready for the next cutting operation.

Referring to Figures 10 to 13 inclusive which cover a modification showing how the apparatus is used for cutting curves, the sawing apparatus is substantially similar to that already described in the previous figures and similar parts bear similar reference numerals.

Loosely mounted upon the boss 33 is a radial bracket 69 held in position by the nuts 69 on said boss 33 and adjustably mounted in said bracket 69 is a radius arm 70 locked in position by the clamping screw 71. Slidably mounted upon the radius arm 70 is a slide block 72 also furnished with a locking screw 73, and pivotally mounted within said slide block 72 is one limb 74 of an inverted U-shaped bracket 75 which limb can be adjusted horizontally and locked in position by the clamping screw 76, and is provided with a pointer 77 adapted to register with the degree markings 78 on the face of the said slide block 72. On the upper end of the limb 74 is an adjustable block 80 furnished with a kerf 81 to accommodate the back-bone 43 of the hack saw 37. The outer limb 82 of the U-shaped bracket 75 has at its lower end a recess 83 and guide block 84 to accommodate the saw blade 36. The work piece 85 is placed between the jaws 17 and located between the ear pieces 31. By movement of the radius arm 70 during the cutting period the saw blade 36 moves arcuately, whereby a curve such as indicated at 86 is provided. In order to cut a complete circle and as the arcuate movement of the radius arm 70 is limited, centre screw pins 88 are employed and inserted in the orifices 64 of the ear pieces 31 (see Figure 13). By screwing in the centre pins 88 the said pins become embedded in the work piece 85 and it thereby becomes pivotally mounted, so that on slackening of the grip of the jaws 17, the work piece 85 can be rotated to another position and again clamped by the jaws 17 ready for the continuation of cutting.

It is to be understood that although the invention has been described as applied to a vise it may be embodied in a vise and not supplied in the form of associated apparatus, and the invention is not limited thereto.

If desirable the guide rods 34 may have washers or other suitable provision for protecting the orifices 28 and 30 from the entry of dirt and the like.

Although this invention is particularly suited to hand sawing operations it may be applied to power saws and the like.

I claim:

1. Improvements in hand sawing apparatus comprising a vise, clamp or the like for holding the work to be sawn, a pair of subsidiary jaws each having a flange adapted to rest upon the top face of one of the jaws of the vise, clamp or the like with the base of each subsidiary jaw taking over the inside face of the vise jaw, the work being clamped between the said subsidiary jaws, fastening devices for securing said subsidiary jaws in place, means mounted on said subsidiary jaws for engaging and guiding the blade and frame of a hack saw in its movement backwards and forwards, such means being mounted for movement with the said hack saw blade in its progressive cutting movement in or through the work.

2. Improvements in hand sawing apparatus according to claim 1 wherein the subsidiary jaw members each have an upstanding and rearwardly extending lug or ear at the back or rear end.

3. Improvements in hand sawing apparatus according to claim 1, wherein the subsidiary jaw members each have an upstanding and rearwardly extending lug or ear at the back or rear end, one or both of said upstanding lugs or ears being formed to receive between them a distance rod to provide for spacing the subsidiary jaws evenly apart at such end.

4. Improvements in hand sawing apparatus according to claim 1 wherein an additional jaw or block is affixed to the inside face of each of the jaw members, vise jaws or the like, such jaws or blocks each having a shaped recess such as a V-shaped one, such recesses being oppositely disposed in pairs and adapted to receive and hold the work therebetween, and means associated with said additional jaws or blocks for furnishing an indication of the extent of radial movement or part-rotation for sawing hexagons and other shapings consisting of a forward extension on one additional jaw or block with an indicating mark or index thereon, a table slidably mounted at the end of said extension for movement transversely thereof, means for effecting such transverse movement, a scale or the like carried by said table registering with said indicating mark or index, a further and arcuate scale on said table, and an indicator or pointer adapted to be removably affixed to the work and having its indicating end moving over the said arcuate scale.

5. Improvements in hand sawing apparatus according to claim 1 wherein an additional jaw or block is affixed to the inside face of each of the jaw members, vise jaws or the like, such jaws or blocks each having a shaped recess such as a V-shaped one, such recesses being oppositely disposed in pairs and adapted to receive and hold the work therebetween, and means associated with said additional jaws or blocks for furnishing an indication of the extent of radial movement or part-rotation for sawing hexagons and other shapings consisting of a forward extension on one additional jaw or block with an indicating mark or index thereon, a table slidably mounted at the end of said extension for movement transversely thereof, means for effecting such transverse movement, a scale or the like carried by said table registering with said indicating mark or index, a further and arcuate scale on said table, and an indicator or pointer adapted to be removably affixed to the work and having its indicating end moving over the said arcuate scale, said means for traversing the slidable table consisting of a transversely set feed screw threaded into the block extension at one end for a lug on the said table and having a finger knob or the like at the other end, and a guide rod set under said feed screw from the said lug and passing through a guide orifice in said extension.

6. Improvements in hand sawing apparatus according to claim 1 wherein an additional jaw or block is affixed to the inside face of each of the jaw members, vise jaws or the like, such jaws or blocks each having a shaped recess such as a V-shaped one, such recesses being oppositely disposed in pairs and adapted to receive and hold the work therebetween, and means associated with said additional jaws or blocks for furnishing an indication of the extent of radial movement or part-rotation for sawing hexagons and other shapings consisting of a forward extension on one additional jaw or block with an indicating mark or index thereon, a table slidably mounted at the end of said extension for movement transversely thereof, means for effecting such transverse movement, a scale or the like carried by said table registering with said indicating mark or index, a further and arcuate scale on said table, and an indicator or pointer adapted to be removably affixed to the work and having its indicating end moving over the said arcuate scale, said indicator or pointer having a collar-like end adapted to take over a work piece, and a clamping screw associated with said collar-like end from which the pointer portion extends.

7. Improvements in hand sawing apparatus, comprising jaw members, a vise, clamp or the like for holding the work to be sawn, means mounted on said jaw members to engage and guide the blade of a hack saw in its movement backwards and forwards, such means being mounted for movement with the said hack saw blade in its progressive cutting movement in or through the work, and consisting of rods, preferably two in number, spaced a suitable distance apart and slidably mounted in recesses or the like in the jaw members, each of said rods being provided with a transverse slot directed towards the upper end and formed to slidably engage with the hack saw blade, such slot leading from a recess extending inwardly from one side of the rod and providing clearance for the saw teeth, a guiding block fitted over said recess, said block having an inner portion forming with the side of the recess a guideway for the saw blade, and being held in place by a clamping screw, and means for guiding the frame of the said hack saw in alignment with the said blade guiding means.

8. Improvements in hand sawing apparatus comprising a vise, clamp or the like for holding the work to be sawn, a pair of subsidiary jaws each having a flange adapted to rest upon the top face of one of the jaws of the vise, clamp or the like with the base of each subsidiary jaw taking over the inside face of the vise jaw, the work being clamped between the said subsidiary jaws, fastening devices for securing said subsidiary jaws in place, said subsidiary jaws each having an upstanding and rearwardly extending lug or ear at the back or rear end, one of said lugs or ears having a horizontally disposed boss, rod or the like upon which is radially mounted a bracket, means for locking said bracket at a radial setting, a radius arm slidably mounted in said bracket and having means for locking it at a setting, a slide block slidably and rotatably mounted upon said radius arm, and a guide bracket mounted upon said slide block, said guide bracket having guide means for slidably engaging the blade of a hack saw and an outer guide or guides for slidably engaging the frame of said hack saw, and a pair of centre screw pins positioned one through each of the unstanding lugs or ears, said pins having an outer head end for manipulation, and an inner tapered or pointed end between the opposite pair of which work is mounted and adapted to be rotated as for arcuate sawing operations.

ERNEST ZIMERMAN.

REFERENCES CITED

The following references are of record in the file of this patent:

UNITED STATES PATENTS

| Number | Name | Date |
| --- | --- | --- |
| 391,093 | Sloat | Oct. 16, 1888 |
| 703,085 | Prentice | June 24, 1902 |
| 1,026,086 | Fisk | May 14, 1912 |
| 1,576,514 | Keeter | Mar. 16, 1926 |
| 2,167,082 | Morris | July 15, 1939 |
| 2,342,322 | Allstock | Feb. 22, 1944 |

FOREIGN PATENTS

| Number | Country | Date |
| --- | --- | --- |
| 267,395 | Germany | Nov. 15, 1913 |